Oct. 26, 1954
T. M. O'HARA
2,692,517
VARIABLE SPEED COUPLING
Filed June 9, 1951
2 Sheets-Sheet 1
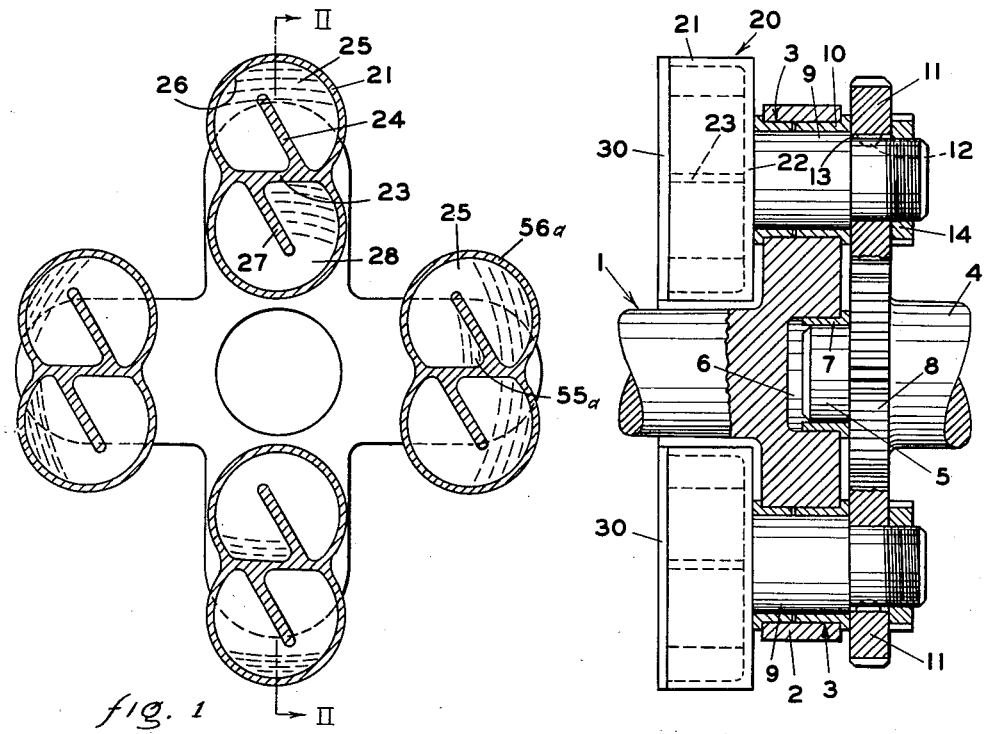
fig. 1
fig. 2
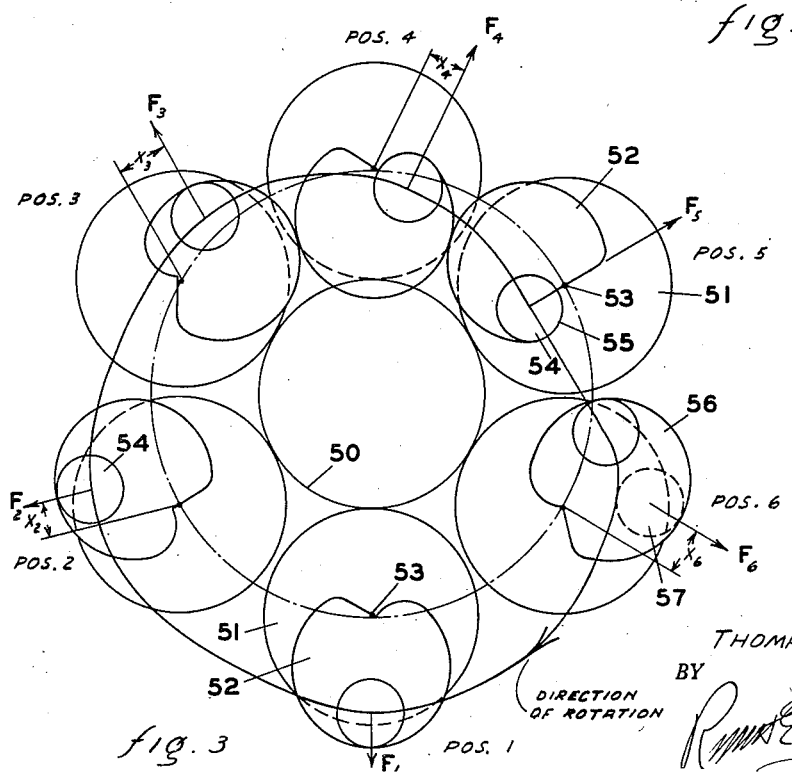
fig. 3
INVENTOR.
THOMAS M. O'HARA
BY Patented Oct. 26, 1954

2,692,517

UNITED STATES PATENT OFFICE 2,692,517

VARIABLE SPEED COUPLING

Thomas M. O'Hara, Detroit, Mich.

Application June 9, 1951, Serial No. 230,772

13 Claims. (Cl. 74—752)

This invention refers to a variable speed coupling, or torque converter, and particularly to a type thereof having a plurality of planetary gears revolving about a sun gear, said planetary gears being provided with liquid containing means utilizing centrifugal force exerted by the liquid within said liquid containing means for resisting rotation of said planetary gears.

In my U. S. Patent No. 2,564,211, of which this disclosure is a continuation-in-part, I have disclosed and described a torque converter construction which utilizes certain novel forces and structural relationships as herein fully set forth. Particularly, a weight is carried on each of said planetary gears and each of said weights is respectively movable with respect to the gear upon which it is carried, but it is movable only within certain predetermined limits. These limits are so selected that when the effect of said weight on said gear is such as to tend to rotate it in a direction opposing the direction of rotation urged thereon by the sun gear, then said weight is positioned to act through a relatively long moment arm. On the other hand, when the effect of said weight is to aid the rotation of the planetary gear as urged by the sun gear, then said weight acts through a relatively short moment arm. Thus, the sum of the action of the several weights onto the several planetary gears provides a net restraining effect against the rotation of each of said planetary gears and power is transmitted through the coupling.

In said U. S. Patent No. 2,564,211, the means particularly disclosed constituted mechanical means for supporting appropriate weights on the respective planetary gears. This apparatus is satisfactory and carries out the purposes intended in a highly effective manner, but the utilization of mechanical parts introduced both the problem of noise in operation and the problem of wear on the parts through which each weight is connected to its respective planetary gear. Thus, it is desirable to provide a mechanism by which the same general principles are employed, and the same advantageous theory of operation is carried out, but in which there is eliminated many of the mechanical parts required by the specific embodiment disclosed in said application Serial No. 120,880, now U. S. Patent No. 2,564,211, by which to obtain a smoother and longer lasting apparatus.

Accordingly, a principal object of this invention is to provide a device employing the same advantageous principles utilized in said above named application Serial No. 120,880, now U. S. Patent No. 2,564,211, but in which many of the mechanical parts therein required are eliminated.

A further object of the invention is to provide a torque converter construction utilizing sun and planetary gears, and in which the means restraining rotation of the planetary gears with respect to the sun gear employs a liquid weight.

A further object of the invention is to provide a torque converter, as aforesaid, in which the means guiding and restraining the movement of the weight with respect to the planetary gear comprises liquid confining means.

A further object of the invention is to provide a torque converter, as aforesaid, which will be simple and easy to construct.

A further object of the invention is to provide a torque converter, as aforesaid, which will have a minimum of moving parts and hence a minimum of maintenance problems.

A further object of the invention is to provide a torque converter, as aforesaid, which will be strong and durable and capable of long life under rigorous usage.

Other objects and purposes of the invention will be apparent to persons acquainted with apparatus of this sort upon reading of the following disclosure and inspection of the accompanying drawings.

In the drawings:

Figure 1 is an end view of a torque converter utilizing the principle of the invention and showing the liquid containing cavities with their respective cover plates removed.

Figure 2 is a section taken on the line II—II of Figure 1.

Figure 3 is a schematic drawing showing the forces involved and illustrating the manner of operation with respect to an imaginary device employed for illustrative purposes.

Summary

Figure 4:
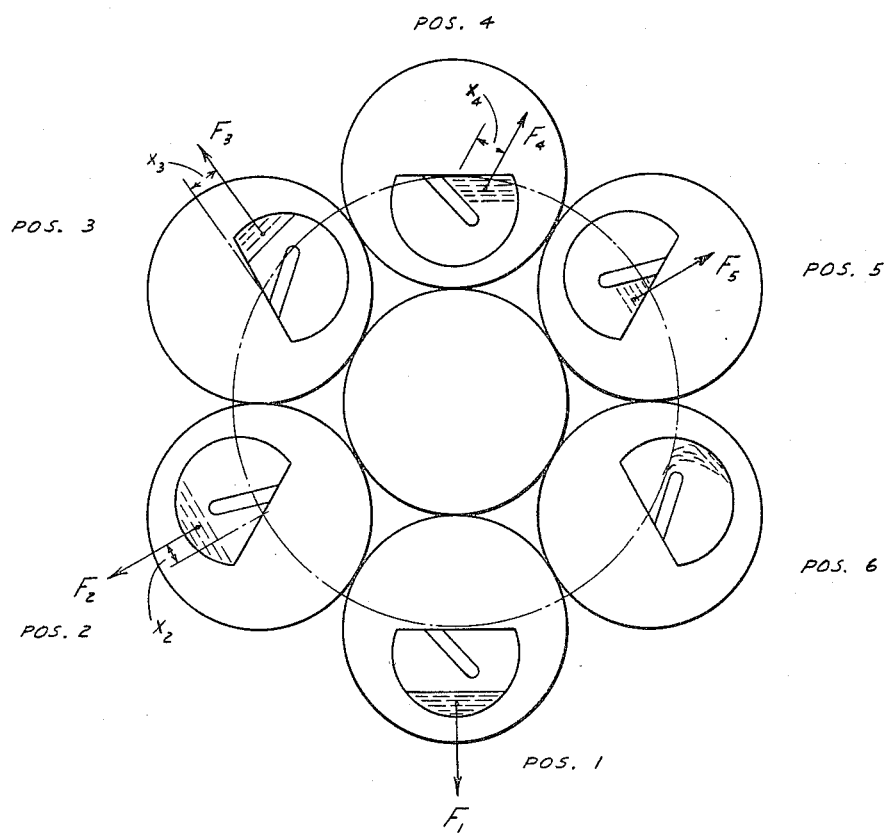
Figure 4 is a schematic drawing illustrating the manner in which the forces operate with respect to the apparatus disclosed.

In carrying out the above objects and purposes, I have provided a structure involving a sun gear, surrounded by planetary gears, and each planetary gear carrying a movable weight. Each said movable weight comprises a quantity of a heavy liquid and a housing rotatable with said planetary gears and restraining the movement of said heavy liquid within certain predetermined regions with respect to the center of said respective planetary gears. The position of said weight is so controlled that when the weight opposes rotation of the planetary gear as urged by the sun gear, it acts on a relatively long moment arm with respect thereto, and when it aids the rotation of the planetary gear as urged by the sun gear, it acts on a relatively short moment arm.

*Detailed description*

While either of the two co-axial shafts hereinafter mentioned may be utilized as the driving shaft and the other thereof utilized as the driven shaft, for purposes of illustration, it will be assumed that the shaft 1 is the driving shaft and the shaft 4 is the driven shaft and the description will proceed on this basis. However, it will be clearly understood throughout that this is by way of example only and that the invention operates equally well and according to the same principles if said driving and driven members are reversed.

A driving shaft 1 is provided with a four-arm spider 2 having openings 3 positioned at the extremities of each of said spider arms. A driven shaft 4 has a pilot 5 conventionally received into a counterbore 6 in the end of the driving shaft 1 and is supported therein by a bushing 7 (Figure 2). Said shafts are thus co-axial and each are mounted by means, not shown, for rotation and for connection to suitable driving and driven means. The driven shaft 4 carries the sun gear 8 at a point thereon adjacent the nearest face of the four-arm spider 2.

The shafts 9 are placed through the openings 3 in the arms of said spider 2 each being mounted in a suitable bushing 10 in a conventional manner and carrying at one end of each thereof a planetary gear 11. Said planetary gears 11 are in mesh with the sun gear 8 and are keyed in any conventional manner, as indicated at 12, to the shaft 9. Each of said planetary gears 11 are conveniently held against a shoulder 13 by a nut 14, or they may be affixed to said shaft 9 in any other conventional manner.

At the other end of each of said shafts 9 there is provided a symmetrical housing 20 having sides 21 and a back 22, the center of symmetry of each of said housing being co-axial with the axis of the shaft upon which it is mounted. A central partition 23 divides said housing into two equal parts. The external contour of said housing 20 is somewhat of a figure 8 shape as shown in Figure 1. A baffle 24 extends from said partition at a point spaced radially from the center of rotation of said housing, said center of rotation being the center of symmetry thereof, toward and past the center of the chamber 25 and terminates adjacent the inner wall 26 of the housing 20 and only provides sufficient clearance to permit the rapid passage from one side of said partition to the other side of a heavy liquid, as mercury, as hereinafter described, is in said chamber. In the particular embodiment illustrated, the baffle 24 is positioned at about 60 degrees of angle with respect to said partition 23, but this is illustrative and not limiting.

A similar baffle 27 is arranged in the chamber 28. Said baffles, chamber, and other associated parts are all dynamically balanced to eliminate vibration at high rotative speeds. Each of the housings 20, associated with each of the planetary gears 11 and mounted respectively on each of the arms of the spider 2, are constructed identically with each other and hence the foregoing description made with respect to the housing 20 applies equally to each of the other housings shown. Within each of said chambers 25 and 28 there is a heavy liquid such as mercury. The exact quantity of such mercury will be somewhat variable according to the particular usage intended, but, by way of example, said chambers may be considered to be approximately $\frac{1}{3}$ filled. A cover member 30 closes each of said housings and cooperates with the side walls and backs thereof for defining the respective closed chambers.

Rotation of the driving shaft 1 without corresponding rotation of the driven shaft 4 will cause revolution of the planetary gears 11 about said sun gear 8 in a well known manner concurrent with rotation of each of said planetary gears about their respective axes.

Reference may now be made to Figure 3 for a diagrammatic illustration of the manner in which this device operates and the manner in which it carries out the principles as above set forth and as further set forth in my U. S. Patent No. 2,564,211. In said Figure 3 there is shown a circle 50 which indicates the sun gear and around the periphery thereof is shown a plurality of circles 51 which show one planetary gear in several of its operating positions. The curved line 52 indicates a housing moving with the gear represented by circle 51 about its center 53 and containing a ball 54 freely movable therein. The ball 54 represents the weight provided by the heavy liquid above described and the curved line 52 represents one half of the housing 20, such as that surrounding the chamber 25.

Beginning with position 1 it will be understood that the ball 54 is urged by a centrifugally induced force $F_1$, said force being the resultant of the forces due to revolution of the weight about the center of the circle 51 and its revolution about the center of the circle 50. Said force is indicated for each of the positions shown by an appropriate subscript as hereinafter appearing and shown in the drawings. Since in this position the force line passes through the center of rotation 53 of the gear it has neither a restraining or an aiding effect thereon, and hence this position may conveniently be the zero point from which to commence analysis of the forces involved in the operation of the herein described mechanism. Moving on to position 2, the gear represented by the circle 51 will have rotated sufficiently that the housing as represented by the curved line 52 now occupies the position shown. The ball 54, still acting under centrifugal force, now occupies the position shown which is spaced a distance indicated by $X_2$ in a direction perpendicular to the direction of said force. Thus there is imposed onto the gear represented by the circle 51 a restraining moment of magnitude equal to $F_2X_2$. Moving on now to position 3, the housing as represented by the circle 52 will have moved still further and into the position shown, and the ball 54 still acting under centrifugal force, will assume the position shown. The effective force acting on said ball will be perpendicular to its tangent at the point at which it contacts the housing as represented by the circle 52 and hence the moment acting in this case to oppose rotation of the gear as represented by the circle 51 will be $F_3X_3$. A similar analysis with respect to position 4 shows that a restraining moment is applied to the gear as represented by the circle 51, which moment will be $F_4X_4$.

Now with respect to position 5, the gear has rotated sufficiently to bring the ball 54 again into radial alignment with respect to the center point 53 and thus no rotative effect in either direction is imposed by the ball onto the gear as represented by the circle 51.

It will be observed that the force of the housing as represented by the circle 52 drawing the ball 54 inwardly toward the center of revolution of the planetary gears will increase the centrifugal force acting on said ball 54 over and beyond that which would be imposed onto it by reason of the revolution alone about said center. Thus, the force acting on the gear as represented by the circle 51 through positions 2, 3 and 4 are not only such as to provide a substantial moment arm through which the ball operates to rotate the gear in a rotation restraining direction, but in drawing the ball against centrifugal force toward the center of the sun gear, even more force is exerted by said ball in a rotation restraining direction than would be effected if the ball were merely held in position at a particular radius.

As the gear passes from position 5 to position 6 the ball is released from the pocket 55 in the housing 52 and is permitted to fly toward the point 56 of said housing as appearing in position 6. This is comparable to the heavy liquid passing from the pocket 55a around the partition and toward the portion 56a of the chamber 25 (Figure 1). During the short period of actual motion of said ball 54 there is no restraining effect placed upon the gear inasmuch as the ball is not in contact with any part of the housing 52. When said ball does come into contact with the housing it will occupy a position substantially as indicated by the broken line 57 in position 6 and the force then acting on the point 56 will be measured by the moment $F_6 X_6$. However, it will be observed that this moment is applied in the direction opposite to that of the other above mentioned moments and is in the direction to aid the rotation of the gear represented by the circle 51. This is an undesirable force, but it is of short duration and the moment arm thereof, $X_6$, rapidly diminishes in length so that said moment also rapidly diminishes to the zero value shown in position 1 (Figure 3).

Thus, this mechanism provides a substantial moment, acting over more than half of the circle of revolution of the planetary gear, for restraining rotation of said planetary gear about its own axis, and a moment in the direction to aid said rotation of said planetary gears for approximately one quarter of the circle of revolution. Although as a matter of mathematics the two points at which the applied moment is zero are instantaneous in extent, as a practical matter the moments acting on said gear on either side of said zero point are sufficiently small for a sufficient distance on either side of each of said zero points that for practical purposes the moment may be considered substantially zero for the remaining one fourth of the circle of revolution.

Now applying the motion and force analysis thus set forth to the fluid filled chambers shown in Figure 1, the similarities will be obvious upon inspection of Figure 4, wherein one of said housings 20 is shown in each of the positions 1 to 6 corresponding to said positions appearing schematically in Figure 3, and the operation of the invention will be clearly apparent.

It is believed that the correspondence will be sufficiently obvious from comparison of Figure 4 with Figure 3 that detailed description thereof is unnecessary and same is accordingly omitted.

Accordingly, I have provided a variable speed coupling or torque converter, which will fully carry out the objects and purposes above set forth.

Although one specific embodiment of my invention has been chosen for illustrative purposes, it is understood that numerous variations may be made in the specific structure herein shown without departing from the scope of the hereinafter appended claims excepting as said claims expressly limit otherwise.

I claim:

1. In a variable speed coupling for attachment to the adjacent spaced ends of a pair of co-axial shafts, rotatable at different speeds, the combination comprising: a driven gear securable to and rotatable with said end of one shaft; a spider having a hub and a plurality of equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; means defining a symmetrical, enclosed, cavity fixed with respect to each driving gear, said cavity having diametrically arranged portions and each of said portions having a baffle therein, each of said baffles extending from a point near the axis of said driving gears toward but not reaching a peripheral portion of the wall defining said cavity and each cavity being partially filled with a relatively heavy liquid; whereby when the spider is rotated in one direction centrifugal force exerted by said liquid and acting upon each driving gear will oppose the rotation thereof during all but a minor portion of each rotation in said one direction and thereby effect a rotation of said driven gear in said one direction.

2. In a variable speed coupling for attachment to the adjacent spaced ends of a pair of co-axial shafts rotatable at different speeds, the combination comprising: a driven gear securable to and rotatable with said end of one shaft; a spider having a hub and a plurality of integral equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; means defining a symmetrical, enclosed, cavity fixed with respect to each driving gear, said cavity being placed eccentric with respect to the axis of rotation of said gear; a partition extending diametrically through said cavity, said partition commencing at one of its ends adjacent the axis of said driving gear but spaced from a wall of said cavity remote from said axis and a heavy liquid partially filling said cavity; whereby once the spider is rotated in one direction centrifugal force exerted by said liquid and acting upon each driving gear will oppose the rotation thereof during all but a minor portion of each rotation in said one direction and thereby effect a rotation of said driven gear in said one direction.

3. The device defined in claim 1 wherein said diametrically disposed portions of said cavity are defined by a common partition and said baffles extend from spaced points on said common partition in opposite directions but parallel to each other, pass through the centers of area of each of said diametric portions of said cavity and terminate at points respectively equally spaced from the opposed portions of the walls defining said respective cavities.

4. The combination defined in claim 3 wherein said baffles each are positioned at an angle with respect to said common partition of approximately 60 degrees.

5. The device defined in claim 3 wherein said baffles are positioned with respect to said common partition at such an acute angle that during one portion of the revolution of each of said portions of said cavity about the respective gear to which the means defining said cavity is affixed, the entire quantity of liquid in each respective portion of said cavity may be held within said acute angle by the centrifugal force generated by the revolution of said liquid about the center of said sun gear.

6. In a variable speed coupling for attachment to the adjacent spaced ends of a pair of co-axial shafts rotatable at different speeds, the combination comprising: a driven gear securable to and rotatable with said end of one shaft; a spider having a hub and a plurality of equally spaced arms extending radially and equidistantly therefrom, said hub being adjacent to said driven gear securable to and rotatable with said end of the other shaft; a plurality of driving gears lying substantially within the plane of said driven gear and positioned for circumferential engagement therewith, each of said driving gears being rotatably supported on one of said arms; walled means defining a pair of similar, adjacent, enclosed cavities, said means being fixed with respect to each driving gear and the centers of said cavities being on diametrically opposite sides of the axis of said driving gear and equidistant therefrom; a baffle in each cavity extending from a point on the wall thereof near said axis to a point spaced from said wall and said axis; and a liquid partially filling each cavity, whereby centrifugal force acting upon said liquid when said spider is rotated will effect a similar rotation of said driven gear.

7. A variable speed coupling for connecting the adjacent ends of a pair of co-axial shafts comprising in combination: a center gear rotatable with one shaft; at least one planetary gear and means rotatably supporting said planetary gear in circumferential engagement with said center gear, said means being rotatable with the other shaft; a single unitary weight; walled means defining a pair of similar, adjacent, enclosed cavities, said walled means being fixed with respect to said planetary gear and the centers of said cavities being on diametrically opposite sides of the axis of said planetary gear and equidistant therefrom; a baffle in each cavity extending from a point on the wall thereof near said axis to a point spaced from said wall and said axis; and a liquid partially filling each cavity, whereby centrifugal force acting upon said liquid when said other shaft is rotated will effect a rotation of said one shaft in the same direction.

8. In a variable speed coupling for attachment to the adjacent spaced ends of a pair of co-axial shafts, rotatable at different speeds, the combination comprising: a driven gear securable to and rotatable with said end of one shaft; a spider having a hub and a plurality of equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; means defining a symmetrical, enclosed, cavity fixed with respect to each driving gear, said cavity having diametrically arranged portions and each of said portions having a baffle therein, and said cavity having its wall remote from the center of rotation of said driving gear concentric with a center point which is spaced toward said wall from the center of rotation of said driving gear; a quantity of relatively heavy liquid partially filling each cavity; whereby when the spider is rotated in one direction centrifugal force exerted by said liquid and acting upon each driving gear will oppose the rotation thereof during all but a minor portion of each rotation in said one direction and thereby effect a rotation of said driven gear in said one direction.

9. In a variable speed coupling for attachment to the adjacent spaced ends of a pair of coaxial shafts rotatable at different speeds, the combination comprising: a driven gear securable to and rotatable with said end of one shaft; a spider having a hub and a plurality of equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; walled means defining a pair of similar, adjacent, enclosed cavities, said means being fixed with respect to each driving gear and the centers of said cavities being on diametrically opposite sides of the axis of said driving gear and equidistant therefrom; a baffle in each cavity extending from a point on the wall thereof near said axis to a point spaced from said wall and said axis, said baffles being substantially parallel and passing through the centers of their respective cavities; and a liquid partially filling each cavity, whereby centrifugal force acting upon said liquid when said spider is rotated will effect a similar rotation of said driven gear.

10. In a variable speed coupling for attachment to the adjacent spaced ends of a pair of coaxial shafts, rotatable at different speeds, the combination comprising: a driven gear securable to and rotatable with said end of one shaft; a spider having a hub and a plurality of equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; means defining an enclosed cavity, said means being fixed with respect to each driving gear and said cavity having a partition dividing same into equal portions, the centers of said portions being on diametrically opposite sides of the axis of said driving gear and equidistant therefrom; a baffle in each portion of said cavity extending from a point on said partition near said axis to a point spaced from said partition and said axis; and a liquid partially filling each portion of said cavity.

11. In a variable speed coupling for connecting adjacent rotatable, coaxial, members, the combination comprising: a driven gear securable to and rotatable with one of said members; a driving member of diameter greater than that of said driven gear and positioned adjacent to said driven gear and being securable to and rotatable with said other rotatable member; a plurality of driving gears lying substantially within the plane of said driven gear and positioned for circumferential engagement therewith, each of said driving gears being rotatably supported upon said driving member; means defining a symmetrically enclosed cavity fixed with respect to each driving gear, said cavity being positioned eccentric with respect to the axis of rotation of said driving gear; a partition extending diametrically through said cavity, said partition commencing at one of its ends adjacent the axis of said driving gear extending toward but spaced at the other of its ends from, a wall of said cavity; and a heavy liquid partially filling said cavity; whereby when said second member is rotated in one direction, centrifugal force exerted by said liquid and acting upon each of said driving gears will oppose the rotation thereof during all but a minor portion of its rotation in said one direction and thereby effect a rotation of said driven gear in said one direction.

12. In a variable speed coupling for connecting adjacent rotatable coaxial members, the combination comprising: a driven gear securable to and rotatable with one of said members; a driving member of diameter greater than that of said driven gear and positioned adjacent to said driven gear and being securable to and rotatable with said other rotatable member; a plurality of driving gears lying substantially within the plane of said driven gear and positioned for circumferential engagement therewith, each of said driving gears being rotatably supported upon said driving member; means defining a symmetrical, enclosed, cavity fixed with respect to each driving gear, said cavity having diametrically arranged portions and each of said portions having a baffle therein, each of said baffles extending from a point near the axis of said driving gears toward but not reaching a peripheral portion of the wall defining said cavity, and each cavity being partially filled with a relatively heavy liquid; whereby when the spider is rotated in one direction centrifugal force exerted by said liquid and acting upon each driving gear will oppose the rotation thereof during all but a minor portion of each rotation in said one direction and thereby effect a rotation of said driven gear in said one direction.

13. In a variable speed coupling for attachment to the adjacent spaced ends of a pair of coaxial shafts rotatable at different speeds, the combination comprising: a driven gear securable to and rotatable with said end of one shaft; a spider having a hub and a plurality of integral equally spaced arms extending radially and equidistantly therefrom, said hub being adjacent to said driven gear and being securable to and rotatable with said end of the other shaft; a plurality of driving gears lying substantially within the plane of said driven gear and positioned for circumferential engagement therewith, each of said driving gears being rotatably supported on one of said arms; means defining a symmetrical enclosed cavity fixed with respect to each driving gear, said cavity being placed eccentric with respect to the axis of rotation of said gear; a liquid body within said cavity; baffles within said cavity extending from a point near the axis of each respective driving gear toward the periphery thereof and effecting movement of said liquid in a direction toward and away from said axis, said baffle being further arranged so that as said driving member rotates about its axis the line of applied centrifugal force generated by said liquid body during a substantial arc of rotation of said driving gear will cause the liquid body to move toward said sun gear and said line of force will be spaced a substantial distance from the axis of said driving gear, and is further so located that during the balance of the arc of rotation of said planetary gear and when said liquid body is moving away from said sun gear the line of applied centrifugal force is spaced a lesser distance from the axis of said driving gear, whereby a net retarding force is applied to said driving gear and a rotative force is thereby applied to the driven gear.

References Cited in the file of this patent

UNITED STATES PATENTS

| Number | Name | Date |
|---|---|---|
| 1,785,338 | Coleman | Dec. 16, 1930 |
| 2,033,343 | Larkin | Mar. 10, 1936 |
| 2,061,867 | De Muynck | Nov. 24, 1936 |
| 2,139,301 | Davey | Dec. 6, 1938 |
| 2,330,374 | Orner | Sept. 28, 1943 |
| 2,491,202 | O'Hara | Dec. 13, 1949 |

FOREIGN PATENTS

| Number | Country | Date |
|---|---|---|
| 357,205 | Italy | Mar. 7, 1938 |